United States Patent [19]

Bloom

[11] Patent Number: 4,620,387
[45] Date of Patent: Nov. 4, 1986

[54] ICE FISHING APPARATUS

[75] Inventor: Ted E. Bloom, Warren, Ohio

[73] Assignee: Pacal Molded Plastics, Warren, Ohio

[21] Appl. No.: 736,253

[22] Filed: May 22, 1985

[51] Int. Cl.⁴ .............................................. A01K 87/00
[52] U.S. Cl. ............................................ 43/17; 43/15
[58] Field of Search ..................... 43/17, 15, 18.1, 16

[56] References Cited

U.S. PATENT DOCUMENTS

| | | | |
|---|---|---|---|
| 2,326,828 | 8/1943 | Camp | 43/24 |
| 2,623,317 | 12/1952 | De Maria | 43/24 |
| 2,638,696 | 5/1953 | Derkovitz | 43/15 |
| 2,714,270 | 8/1955 | Premo | 43/17 |
| 2,803,912 | 8/1957 | Kellar | 43/16 |
| 3,603,017 | 9/1971 | Happe | 43/17 |
| 3,621,599 | 11/1971 | Uhlich et al. | 43/15 |
| 3,729,849 | 5/1973 | Richard | 43/17 |
| 3,881,269 | 5/1975 | Timmons | 43/15 |
| 4,080,748 | 3/1978 | Ohmura | 43/24 |
| 4,242,828 | 1/1981 | Schurger | 43/137 |
| 4,373,287 | 2/1983 | Grahl | 43/17 |

FOREIGN PATENT DOCUMENTS

| | | | |
|---|---|---|---|
| 507889 | 12/1954 | Canada | 43/17 |
| 727359 | 2/1966 | Canada | 43/17 |
| 1149161 | 7/1983 | Canada | 43/21.2 |

Primary Examiner—Gene P. Crosby
Attorney, Agent, or Firm—Watts, Hoffmann, Fisher and Heinke Co.

[57] ABSTRACT

An ice fishing pole and supporting stand are constructed from modular molded plastic components. The pole has an elongated end portion for dropping a line into the water and a reel portion about which the line is wound. Along the elongated pole portion are three cylindrical trunnions supportable in a plastic upright stand. The three trunnions allow the pole to rotate when a fish strikes to give a visual indication that a fish is on the line. When this occurs the fisherman can grab the pole out of the stand and reel in the fish. An ice skimming attachment facilitates use of the pole by allowing the fisherman to skim away ice from his or her fishing hole.

10 Claims, 15 Drawing Figures

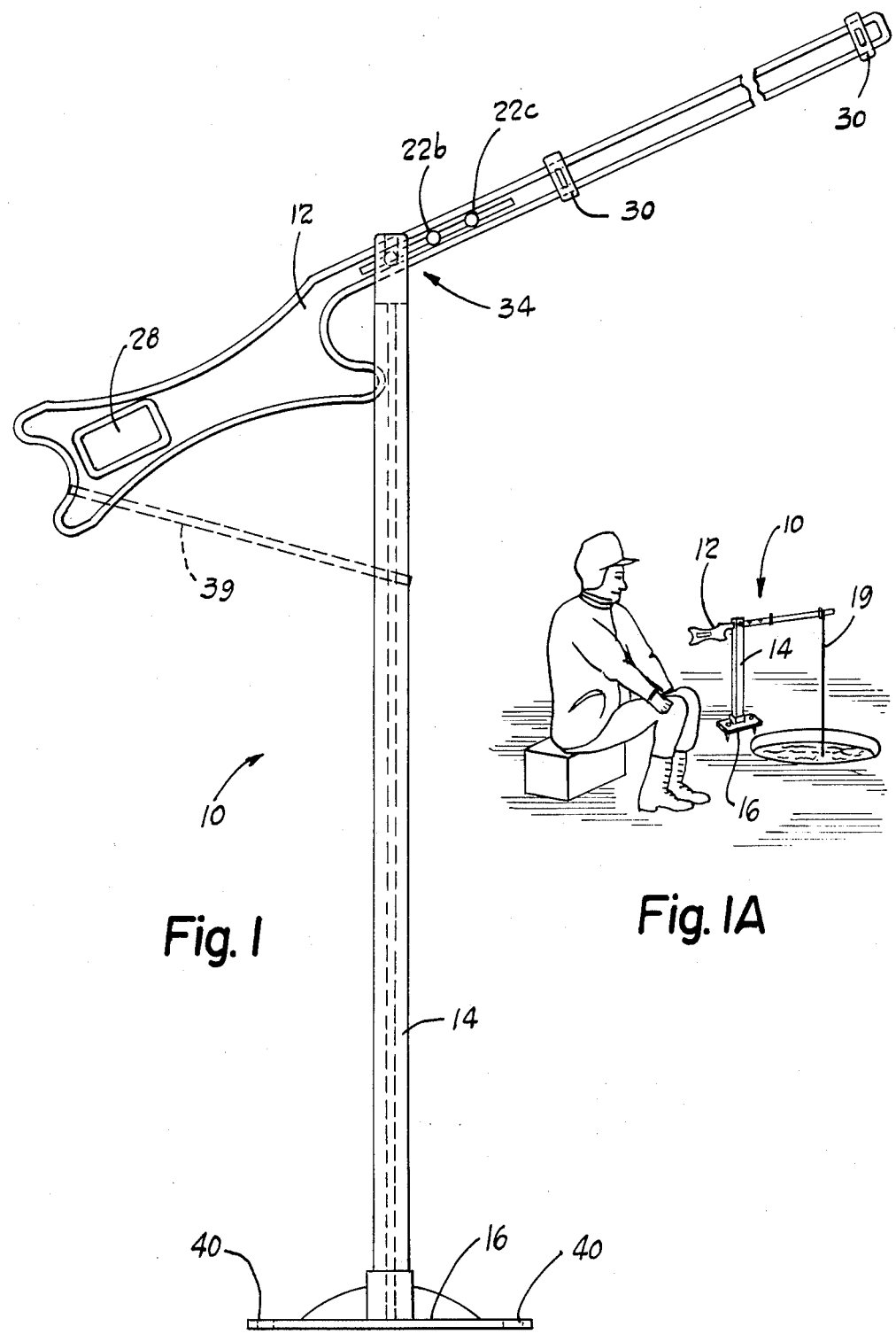

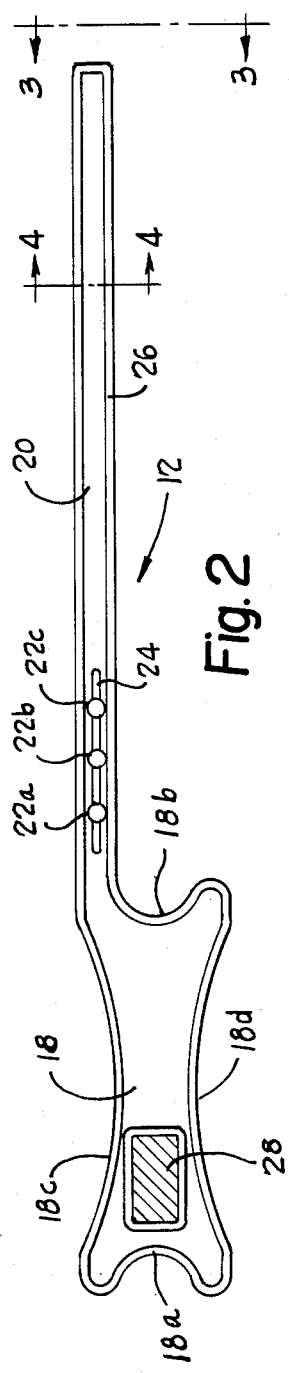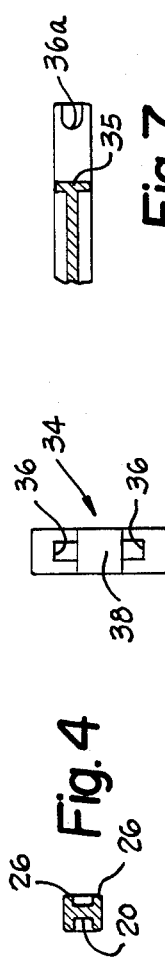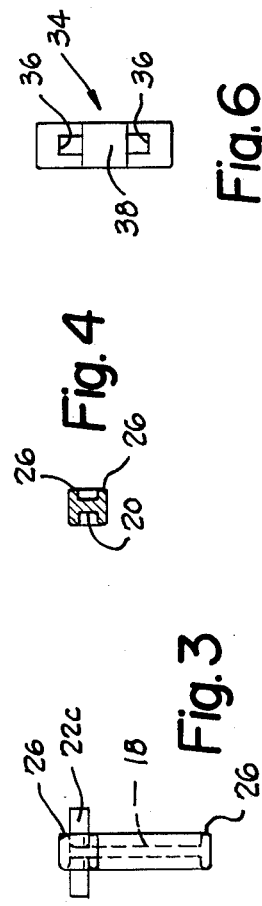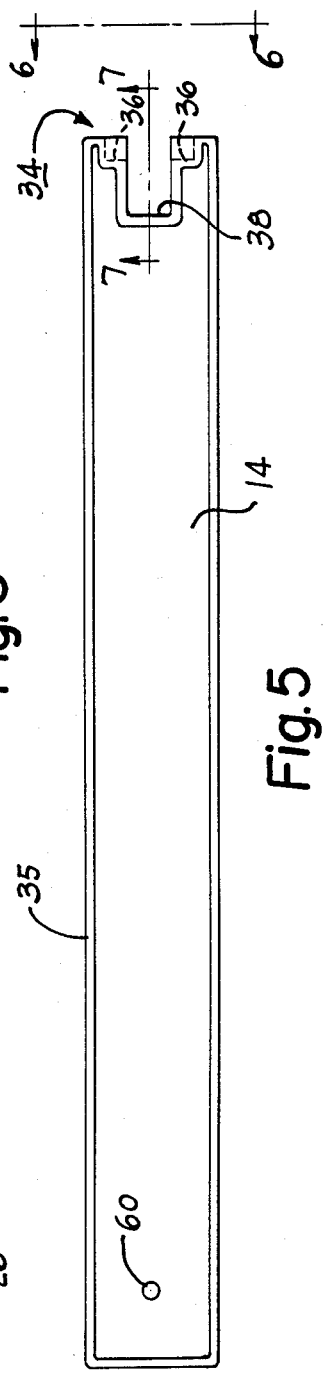

ICE FISHING APPARATUS

TECHNICAL FIELD

The present invention relates to ice fishing and more particularly to an ice fishing pole and support assembled from modular plastic components.

BACKGROUND ART

Fishermen have long known that they could extended their fishing season year round by cutting through ice covered bodies of water to gain access to the fish. Conventional fishing equipment, i.e. rod and reel is not necessary for such fishing. There is no need for accurate casting so that a simple reel to store the line has been sufficient for crude ice fishing. Various prior art patents add a degree of sophistication, however, to ice fishing. These patents are directed at solving a number of perceived problems and some of them employ rather sophisticated and complex devices for dropping a line through a hole in the ice.

DISCLOSURE OF INVENTION

Applicants invention is a lightweight, mechanically simple device which can be quickly and easily constructed at the ice fishing site yet which provides some of the sophistication achieved at a greater cost by the more complex apparatus disclosed in the prior art.

The ice fishing apparatus of the invention includes an elongated plastic pole having one or more eyelets spaced along the length of the pole for guiding a fishing line into the water at one end of the pole. A reel at an opposite end of the pole stores line in a way that allows the fisherman to efficiently unwind line and feed it into the water. A pivot defining trunnion extends from the sides of the pole and mates with a plastic stand for supporting the pole.

The stand includes a cavity at one end which forms a bearing for the trunnion. The fit between bearing and trunnion is tight enough to support the pole yet loose enough to allow the pole to pivot about a fulcrum point in response to a fish striking the line. The pole can be withdrawn from the stand and used somewhat like a conventional fishing pole. Thus, the fisherman upon noticing a strike can grab the pole and play the fish much more effectively than if he has merely a line stored on a reel.

The stand is supported in a base member having a center slot slightly larger than the stand so that another interference fit between stand and base supports the apparatus in an upright position on an ice surface. A preferred base member includes at least two holes so that spikes can be driven through the holes and into the ice to support the ice fishing apparatus.

Each of the aforementioned elements is made from molded plastic. Assembly involves merely piecing the parts together in a simple manner and securing the entire apparatus to the ice. In one embodiment of the invention the eyelets are rectangular members which slip over the fishing pole and are movable along the elongated pole. This allows the entry point of the line into the water to be easily adjusted.

One embodiment of the invention includes three trunnions integrally formed with the pole. The fisherman can choose a different pole pivot by choosing a different trunnion to mate with the stand. This allows the static equilibrium of the pole to be adjusted. A preferred reel includes a counterweight of metal within the reel. This also affects the balancing characteristics of the apparatus and in particular balances sinkers, lures, etc at the end of the fishing line.

Use of molded plastic makes the entire apparatus lightweight and since the individual parts can be readily disassembled, the entire apparatus can be packaged in a compact way for carrying to and from the fishing site. Molded plastic while lightweight, is also rugged and will withstand substantial use without suffering damage that might affect performance of the apparatus.

One object of the invention is therefore a compact lightweight and easy to assemble ice fishing apparatus. This and other objects, advantages and features of the invention will be better understood when a preferred embodiment of the invention is described in conjunction with the accompanying drawings.

BRIEF DESCRIPTION OF THE DRAWINGS

FIG. 1 is an elevation view of an assembled ice fishing apparatus;

FIG. 1a is a perspective schematic of the apparatus in use at an ice fishing site;

FIG. 2 is an elevation view of an ice fishing pole;

FIG. 3 is a view from the direction 3—3 of FIG. 2;

FIG. 4 is a sectional view taken along the line 4—4 in FIG. 2;

FIG. 5 is an elevation view of an ice fishing stand constructed in accordance with the invention;

FIG. 6 is a plan view of the FIG. 5 stand;

FIG. 7 is a partial sectional view taken along the line 7—7 in FIG. 5;

BEST MODE FOR CARRYING OUT THE INVENTION

Figure 8:
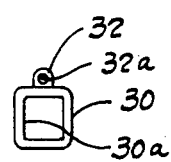
FIG. 8 is an elevation view of an eyelet for guiding fishing line into the water.
Figure 9:
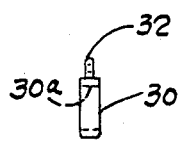
FIG. 9 is a side elevational view of the FIG. 8 eyelet.
Figure 10:
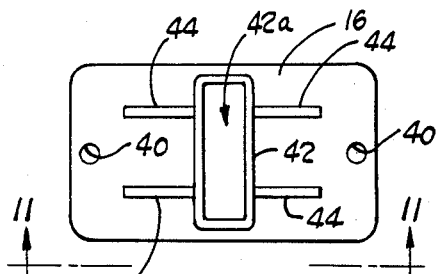
FIG. 10 is a plan view of an ice fishing base.

Turning now to the drawings, FIG. 1 illustrates ice fishing apparatus 10 constructed in accordance with the invention. The apparatus 10 comprises modular molded plastic components that are individually shown in FIGS. 2—14. The FIG. 1 apparatus 10 includes a pole 12 supported by an upright stand 14 fixed in a base support 16.

The pole 12 includes a combination handle/reel 18 at one end. Fishing line 19 can be wound and unwound to and from this reel by the fisherman (FIG. 1a). Inwardly curved end surfaces 18a, 18b allow the line to be wound about the handle so that the line does not unintentionally slip off the handle 18. Less severely inwardly curved top and bottom surfaces 18c, 18d allow the handle/reel 18 to be easily grasped by the ice fisherman.

The reel 18 narrows to an elongated pole section 20 supported by the stand 14. Three trunnions 22a, 22b, 22c in the form of cylindrical bosses extend on either side of the elongated pole section 20. At the region of the trunnions 22a, 22b, 22c the pole is reinforced with a rib 24.

Turning now to FIGS. 3 and 4, both the elongated portion 20 and handle portion 18 of the pole 12 are seen to comprise a relatively thin center portion which is bounded about the periphery of the pole 12 by a flanged edge 26 roughly three times thicker than the center. In section, the edge 26 and center portion of the elongated pole section 20 resemble an "I" beam (FIG. 4).

Integrally molded in the handle 18 is a metallic insert 28 whose size and weight can be varied to adjust the balance characteristics of the pole 12. This feature in combination with the ability to select any one of the three trunnions 22a, 22b, 22c allows the pole 12 to be balanced in the orientation shown in FIG. 1 for different weight sinkers, hooks, lures, etc.

Two eyelets 30 (FIGS. 8 and 9) are positioned along the elongated pole section 20 to guide the fishing line 19 from the reel 18 into the water. Each of the eyelets 30 defines a generally square inner surface 30a which engages the pole edge 26 along the elongated pole portion 20. Since the engagement between the eyelets 30 and the pole 12 is an interference fit, the eyelets can be moved along the pole until a proper balance and entry point of the line 19 into the water is achieved. Each eyelet 30 includes a flange 32 having holes 32a formed in the flange through which the fishing line is fed.

Turning now to FIG. 5, details regarding the stand 14 are disclosed. At one end, the stand 14 supports the pole via a trunnion support bearing 34. Like the pole 12, the stand 14 has an edge 35 extending around its periphery. At the region of the bearing 34 the edge widens and includes two slots 36 having semicircular bottom surfaces 36a that engage a selected one of the trunnions 22a, 22b, 22c. To accommodate rotation of the fishing pole, the stand 14 also defines a notch 38 that separates the slots 36 so that as the fishing pole 12 rotates the edge 26 of the pole can move freely within the notch 38. The engagement between trunnion and bearing is such that the pole can rotate in response to a strike by a fish yet the pole 12 is securely positioned and supported by the stand 14. The use of a trunnion bearing arrangement also allows the pole 12 to be manually withdrawn from the stand so the fishermen can reel in a fish without having his or her movement restricted by the stand 14.

An automatic hook setting attachment 39 is shown positioned on the apparatus 10 in FIG. 1. This attachment 39 is an elastic band that can be slipped over the pole 12 to tension the pole. When a fish strikes a hook and pulls on the line 19 the band stretches as the pole pivots about the stand bearing 34. The tensioned band then pulls the pole back to the FIG. 1 configuration to set the hook.

Figure 11:
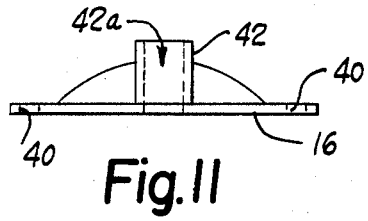
FIG. 11 is an elevation view of the FIG. 10 base as seen from the direction 11—11 in FIG. 10.

At an opposite end of the stand 14, the pole and stand are supported by the base 16. The base (FIG. 10) is a generally rectangular member with rounded corners having two holes 40 extending therethrough. At a center portion of the base 16, an upright stanchion 42 defines a rectangular opening 42a extending through the stanchion. Inner wall surfaces of the stanchion 42 engage and support the stand and pole in the upright orientation shown in FIG. 1. In particular, the wall surfaces of the stanchion 42 engage the stand edge 35 via an interference fit so the stand can be easily inserted into and removed from the base. The upright stanchion 42 is reinforced with four rib members 44 (FIG. 11). The holes 40 serve as means for securing the base, stand, and fishing pole to the ice. Specifically, metal spikes or the like are inserted through the holes 40 and driven into the ice to secure the apparatus 10 next to a hole which has been cut in the ice.

Figure 12:
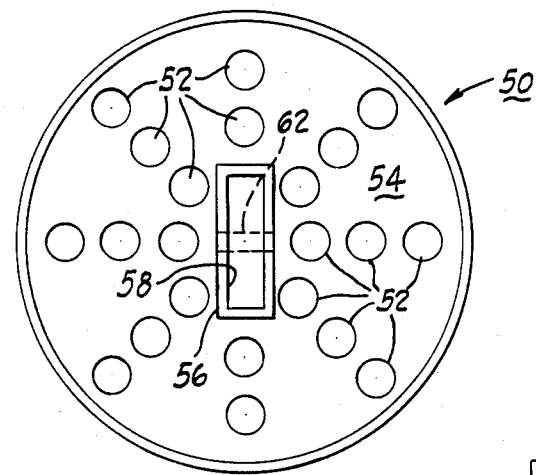
FIG. 12 is a plan view of an ice skimming attachment.
Figure 14:
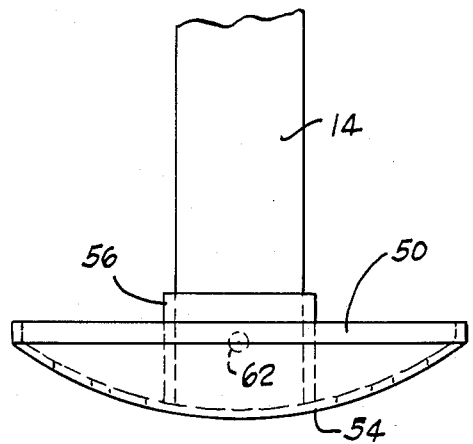
FIG. 14 is an elevation view of the skimming attachment mated with the stand shown in FIG. 5.
Figure 13:
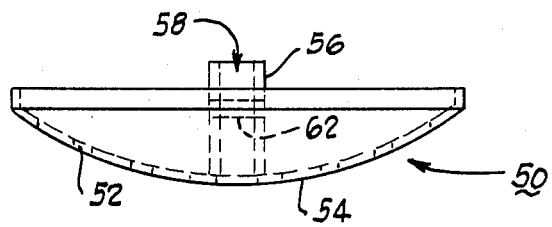
FIG. 13 is an elevation view of the skimming attachment.

An important convenience feature of the invention is an ice skimmer 50 (FIGS. 12, 13). The skimmer 50 is a generally cup like molded plastic member with a plurality of holes 52 extending through a convex bottom 54. The skimmer 50 includes s stanchion 56 that is connected to the convex bottom 54. The stanchion 56 defines a center opening 58 having the same rectangular dimensions as the opening 42a in the base stanchion. To use the skimmer 50, the fisherman removes the stand 14 from the base 16 and slips the skimmer over the stand and secures it to the stand with a pin (not shown). The pin is slipped through holes 60, 62 that align in the stand 14 and skimmer 50. Alternately, the stand 14 can be made to include a flange at its base end that is wider than the openings 42a (base), 58 (skimmer). In this embodiment, the skimmer 50 is slipped over the stand bearing 34 and slid along the stand until the skimmer bottom 54 engages the flanged end of the stand. Once the skimmer 50 has been connected to the stand 14 ice forming in the fishing hole is easily skimmed off the water. Water flows through the holes 52 and ice is captured within the cup-like skimmer.

The specific plastic choosen for the apparatus 10 is not critical so long as it does not become brittle at cold temperatures. A preferred pole 12 is approximately 16 inches long and the stand 14 is also about 16 inches high. Other dimensions are, of course, possible. Although the ice fishing apparatus of the invention has been described with a degree of particularity, it is applicant's intent that the invention encompass all alterations and modifications falling within the spirit or scope of the appended claims.

I claim:
1. Ice fishing apparatus comprising:
an elongated plastic fishing pole supporting one or more eyelets for guiding a fishing line into an ice fishing hole, a reel having inwardly curved end surfaces spaced from each other for storing fishing line and further having inwardly curving top and bottom surfaces for gripping said reel, and a pivot defining trunnion member intermediate the eyelets and the reel, said trunnion member including cylindrical bosses extending from both sides of the pole;
a plastic stand for supporting the pole, said stand having a cavity at one end to define a bearing for said trunnion member, an interference fit between the stand and trunnion allowing rotation of the pole in response to a torque applied about the pivot; said interference fit further allowing the pole to be withdrawn from the stand by an upward force on the pole; and
a plastic base member having a center slot to receive the stand and support the stand in an upright position on an ice surface.

2. The apparatus of claim 1 wherein the pole includes a plurality of trunnions extending from both sides of the pole spaced along the length of the pole so that the balance of the pole within the bearing is adjustable by selecting different ones of said plurality of trunnions to support the pole.

3. The ice fishing apparatus of claim 1 additionally comprising a plastic ice skimming attachment which mates with the stand to allow ice to be skimmed from water as it forms in an ice fishing hole.

4. The apparatus of claim 1 where the reel is weighted with a metal insert to define the balancing characteristics of the pole within the bearing.

5. The ice fishing apparatus of claim wherein the eyelets comprise rectangular plastic members that fit over the elongated pole and can be positioned along the pole, said eyelets further including extensions from one surface jf the rectangular plastic members having a hole therethrough to guide a fishing line into the water.

6. The ice fishing apparatus of claim 1 where the reel and pole are integral with each other and both reel and pole include relatively thin center portions bounded by a thicker edge extending about a periphery of said reel and pole.

7. Ice fishing apparatus comprising:
   an elongated plastic fishing pole having one or more eyelets for guiding a fishing line, a reel for storing fishing line and a pivot defining trunnion member intermediate the eyelets and the reel, said trunnion member including cylindrical bosses extending from both sides of the pole;
   a plastic stand for supporting the pole, said stand having a cavity at one end to define a bearing for said trunnion member, an interference fit between the stand and trunnion allowing rotation of the pole in response to a torque applied about the pivot; said interference fit further allowing the pole to be withdrawn from the stand by an upward force on the pole;
   a plastic base member having a center slot to receive the stand and support the stand in an upright position on an ice surface; and
   a plastic ice skimming attachment which mates with the stand to allow ice to be skimmed from water as it forms in an ice fishing hole.

8. The apparatus of claim 7 wherein the pole includes a plurality of trunnions extending from both sides of the pole spaced along the length of the pole so that the balance of the pole within the bearing is adjustable by selecting different ones of said plurality of trunnions to support the pole.

9. The apparatus of claim 7 where the reel is weighted with a metal insert to define the balancing characteristics of the pole within the bearing.

10. The ice fishing apparatus of claim 7 wherein the eyelets comprise rectangular plastic members that fit over the elongated pole and can be positioned along the pole, said eyelets further including extensions from one surface of the rectangular plastic members having a hole therethrough to guide a fishing line into the water.

* * * * *